April 2, 1963 H. NERWIN 3,083,626
INDICATORS FOR PHOTOELECTRICALLY CONTROLLED CAMERAS
Filed June 27, 1961 6 Sheets-Sheet 1

HUBERT NERWIN
*INVENTOR.*
BY *R. Frank Smith*
*Robert W. Hampton*
ATTORNEYS

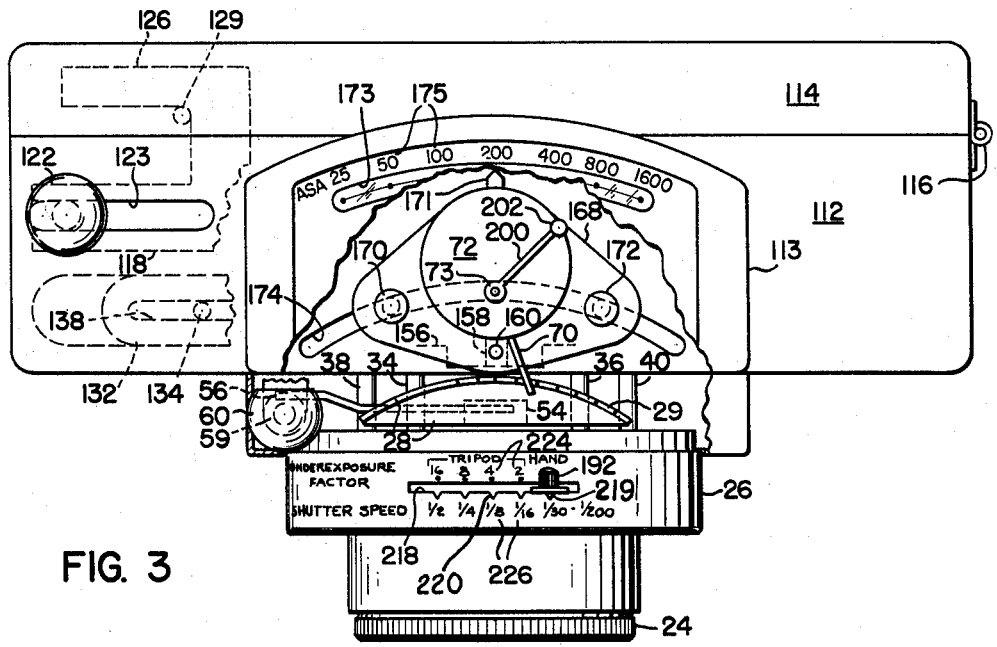
FIG. 3
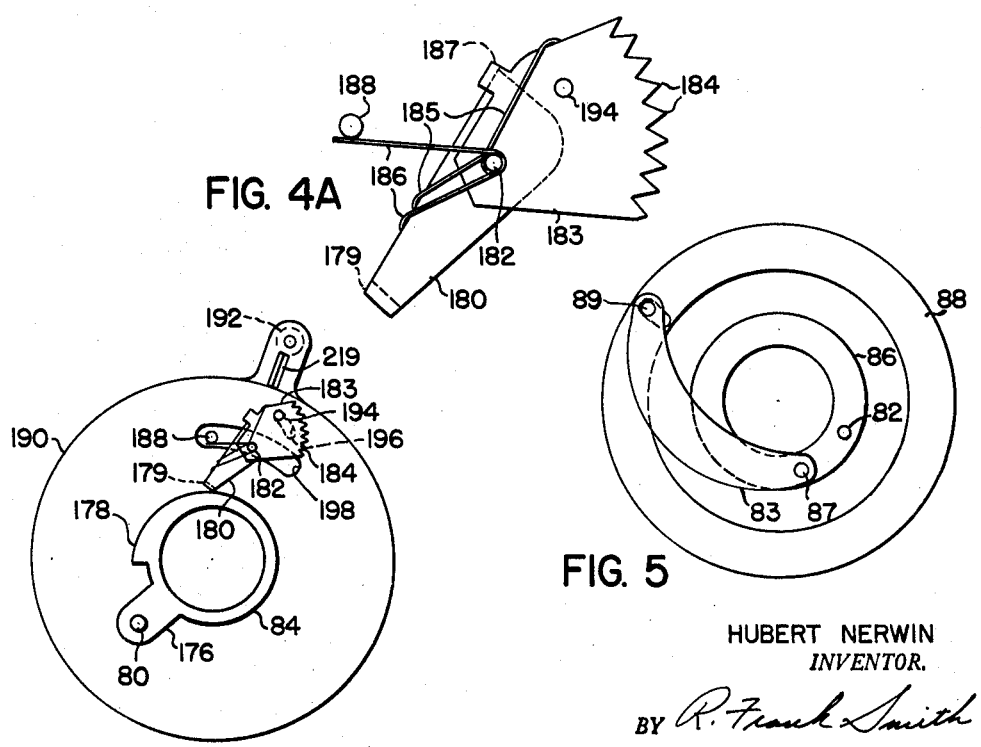
FIG. 4A
FIG. 4
FIG. 5
HUBERT NERWIN
INVENTOR.
BY R. Frank Smith
Robert W. Hampton
ATTORNEYS April 2, 1963 H. NERWIN 3,083,626
INDICATORS FOR PHOTOELECTRICALLY CONTROLLED CAMERAS
Filed June 27, 1961 6 Sheets-Sheet 4

HUBERT NERWIN
*INVENTOR.*

BY R. Frank Smith
Robert W. Hampton
ATTORNEYS

April 2, 1963 H. NERWIN 3,083,626
INDICATORS FOR PHOTOELECTRICALLY CONTROLLED CAMERAS
Filed June 27, 1961 6 Sheets-Sheet 5

HUBERT NERWIN
*INVENTOR.*

BY R. Frank Smith

Robert W. Hampton
ATTORNEYS

United States Patent Office 3,083,626
Patented Apr. 2, 1963

3,083,626
INDICATORS FOR PHOTOELECTRICALLY
CONTROLLED CAMERAS
Hubert Nerwin, Rochester, N.Y., assignor to Eastman
Kodak Company, Rochester, N.Y., a corporation of
New Jersey
Filed June 27, 1961, Ser. No. 120,027
17 Claims. (Cl. 95—10)

The present invention pertains to cameras with automatic exposure control devices in which means are provided for enabling the photographer to determine the degree of underexposure or overexposure that would occur when the camera is used at light levels below or above the normal exposure range of the camera.

Cameras are known wherein the actuating mechanism is equipped with a signal that may become visible in the viewfinder or with a blocking mechanism that prevents actuation of the camera, in the event that the scene or field brightness is below or above the normal exposure range of the camera. Either one of these devices, however indicates only that a normal exposure is not possible but does not show in a quantitative manner the degree of underexposure or overexposure.

The present invention solves this problem by indicating the factor of underexposure or overexposure, beyond the normal exposure range of the camera. This is accomplished, for example, by a secondary indicator integral with the moving coil of the instrument. The secondary indicator becomes visible within a window in the camera cover. The window is divided into zones representing factors of underexposure corresponding to geometrically decreasing values of field brightness and/or film speed.

It is therefore a primary object of the invention to indicate quantitatively the amount of underexposure or overexposure that would occur in a camera, given a particular adjustment of the exposure control system of the camera and a particular field brightness.

Another object of the invention is to indicate the extent of such underexposure or overexposure beyond the normal range of a photoelectrically controlled exposure system in the camera.

Other objects of the invention will appear from the following description, reference being made to the accompanying drawings, wherein:

FIG. 3 is a top view, partly broken away, of the mechanism shown in FIGS. 1 and 2;

FIG. 4 is a front view of a portion of the shutter speed control mechanism;

FIG. 4A is an enlarged detail of the mechanism shown in FIG. 4;

FIG. 5 is a front view of a portion of the diaphragm control mechanism;

Automatic Exposure Control

Figure 1:
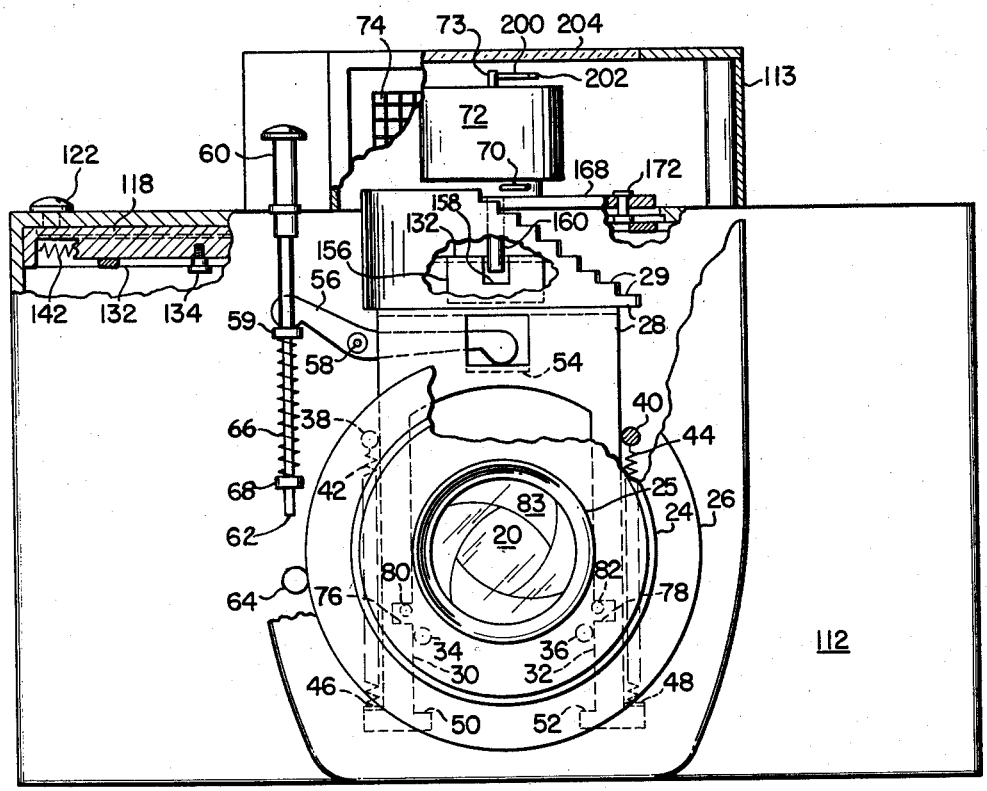
FIG. 1 is a front view of the camera, partly broken away, showing the photoelectric exposure control mechanism, the film-speed adjusting mechanism, and the off-range indicator.
Figure 2:
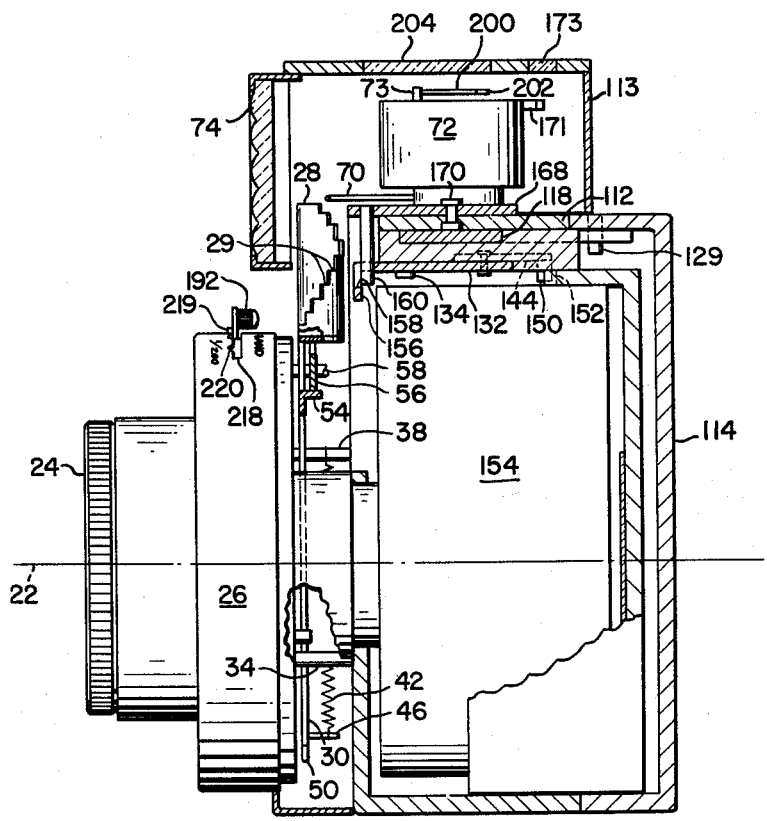
FIG. 2 is a right side view, partly in section, of the structure shown in FIG. 1.
Figure 6:
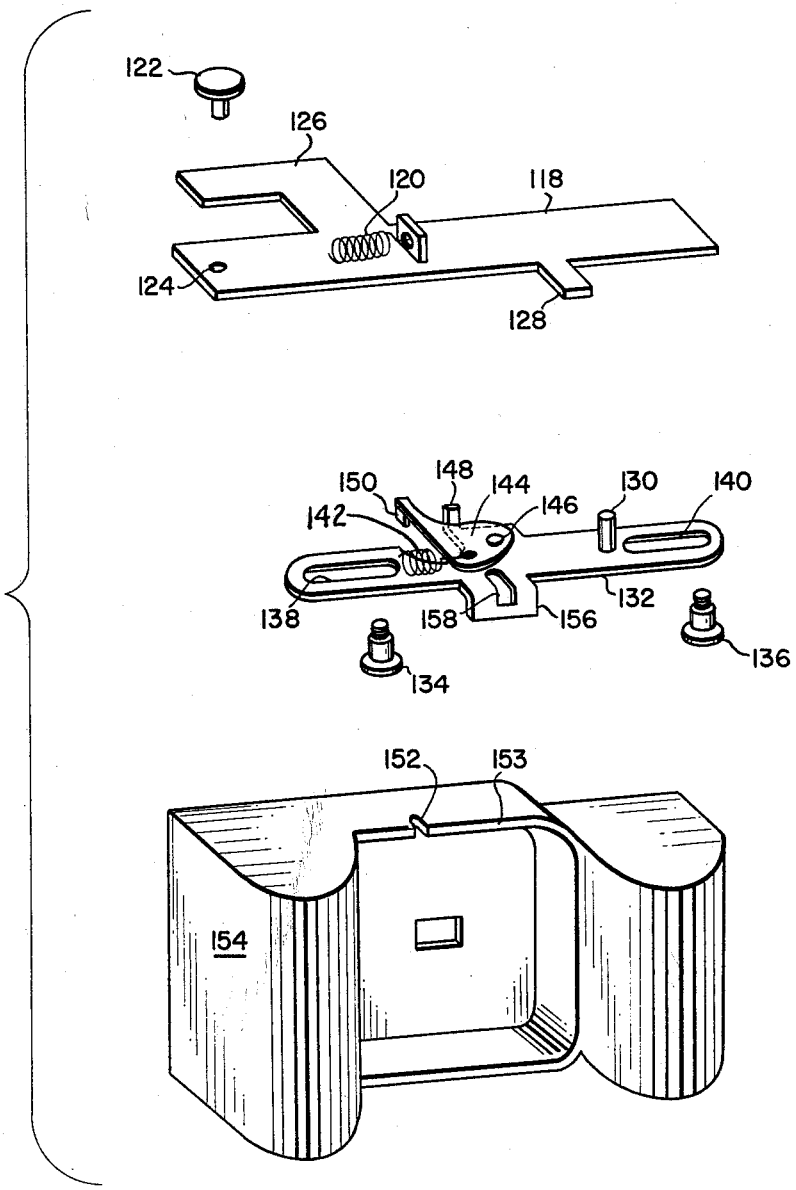
FIG. 6 is an exploded isometric view of the film-speed setting mechanism.

Referring to FIGS. 1, 2 and 3, a typical camera embodying the present invention includes a taking lens 20 arranged on an axis 22 and mounted in a focusing member 24, which in turn is mounted for rocking movement about a hub 25. On the rear surface of a shutter housing 26 a sensing member 28 is arranged symmetrically about a vertical line through the center of hub 25. The sensing member 28 is adapted to slide vertically and for this purpose has a pair of arms 30 and 32, which are guided by a pair of lower studs 34 and 36 and a pair of upper studs 38 and 40. The upper studs 38 and 40 also serve as posts for a pair of springs 42 and 44, which are connected to respective ears 46 and 48 of the sensing member and urge the latter in an upward direction as shown in FIG. 1. Respective lobes 50 and 52 are provided on arms 30 and 32 of the sensing member for engagement with lower studs 34 and 36 to limit the upward travel of the sensing member.

On the upper portion of sensing member 28 a projecting ear 54 is adapted for contact by one end of a rocker 56, which is pivotally mounted at 58. The other end of rocker 56 cooperates with a flange 59 on the camera actuating member 60, which is mounted for vertical movement on the front surface of the camera and has a bottom surface 62 adapted to contact the shutter release lever 64 for tripping the shutter after the sensing member 28 has undergone its maximum upward movement in the manner described below. A compression spring 66, which is stronger than the combination of springs 42 and 44, is mounted on actuating member 60 between the lower surface of flange 59 and a fixed support 68. Spring 66, which is adapted for compression by manual depression of member 60, normally maintains that member in its uppermost position, thereby maintaining rocker 56 in its maximum clockwise position (as viewed in FIG. 1) and maintaining sensing member 28 in its lowermost position with springs 42 and 44 under tension.

A sloping upper edge 29 of sensing member 28 is adapted to engage the pointer 70 of a measuring instrument 72 as the sensing member is moved upwardly by springs 42 and 44 when actuating member 60 is manually depressed. The sloping edge 29 preferably is stepped, as shown in the drawings, in order to contact pointer 70 only in the direction of movement of the sensing member. The measuring instrument, along with a photocell 74 by which it is energized, constitutes an exposure meter. In a manner well known in the art pointer 70 is moved to the right (as viewed in FIGS. 1 and 3) in response to increased field brightness and therefore permits sensing member 28 to move further upward before its sloping edge 29 contacts the pointer. Continued depression of actuating member 60, after sensing member 28 contacts pointer 70, trips the shutter release lever 64.

A pair of recesses 76 and 78 in the respective lower arms 30 and 32 of sensing member 28 are adapted to receive pins 80 and 82, which are integral with an arm 176 of a rotatably mounted shutter speed ring 82 (FIG. 4) and with a rotatably mounted diaphragm ring 86 (FIG. 5). Each of a plurality of diaphragm blades 83 is pivotally mounted at each of its ends at 87 and 89 to ring 86 and to an outer ring 88, respectively. The shutter speed ring 84 (FIG. 4) and the diaphragm ring 86 (FIG. 5) constitute "exposure regulating devices," as that term is employed in the appended claims.

It will be seen that counterclockwise rotation of ring 86 moves the diaphragm blades 83 in a direction to reduce the size of the taking lens aperture. Similarly, clockwise rotation of shutter speed ring 84 moves a cam 178, which is integral with ring 84, into engagement with an ear 179 of a lever 180, shown in greater detail in FIG.

4A. Cam 178 pivots lever 180 clockwise about a pin 182 and imparts arcuate movement to a gear segment 184 on the outer edge of a member 183, which is pivotally mounted at 182 on lever 180. A spring 186, stressed against a post 188, urges lever 180 and its member 183 counterclockwise to maintain ear 179 in contact with ring 84 or cam 178. A spring 185 urges member 183 clockwise about pin 182, normally maintaining an ear 187 on member 183 in contact with lever 180 so that gear segment 184 follows the clockwise movement of lever 180. Lever 180 and its gear segment 184 constitute the driving member of the retarding mechanism of a shutter and are well known in the art. The shutter is fully disclosed, for example, in U.S. Patent No. 2,331,-569, granted October 12, 1943 to Pirwitz.

The initial position of lever 180 corresponds to minimum shutter speed for hand-held cameras, e.g., 1/30 second; clockwise movement of that lever (by cam 178) produces higher shutter speeds, e.g., 1/50 second to 1/200 second.

In situations described hereinafter it may be desirable to employ a shutter speed slower than 1/30 second, i.e., a shutter speed normally associated with tripod mounting of the camera. For this purpose, a shutter speed control disk 190 is manually rotatable about the lens axis by a knob 192 integral with the disk. A pin 194 in gear segment member 183 engages a slot 196 in disk 190. Slot 196 forms an arc of a circle having its center at pivot pin 182 and therefore permits pin 194 and member 183 to move clockwise about pin 182 independently of disk 190 when cam 178 engages ear 179 of lever 180. Although lever 180 is blocked from counterclockwise movement by its engagement with ring 84 or cam 178, counterclockwise movement of disk 190, which occurs by manual operation of knob 192, moves pin 194 and member 183 counterclockwise about pin 182 against the tension of spring 185. This moves gear segment 184 in the direction for reducing shutter speed below 1/30 second, i.e., below the minimum normal shutter speed for hand-hold cameras. A slot 198 in disk 190 permits pin 182 and post 188 to extend through disk 190 at any position of the disk.

As the sensing member 28 (FIGS. 1-3) moves upwardly, the lower surfaces of recesses 76 and 78 contact pins 80 and 82 and move them upwardly until the sensing member is stopped by the instrument pointer 70. This movement rotates rings 84 and 86 clockwise and counterclockwise, respectively, to adjust both shutter speed and diaphragm opening as related functions of scene brightness.

From the foregoing it is seen that both diaphragm and shutter speed are adjusted during the upward movement of the sensing member 28. These exposure factors are adjusted in the same sense, i.e., from larger to smaller diaphragm opening and from lower to higher shutter speed, or vice versa, so that the overall exposure value is changed either from low to high or vice versa in response to upward movement of sensing member 28. In the embodiments of the invention illustrated in the accompanying drawings, the concurrent automatic adjustments are from larger to smaller diaphragm opening and lower to higher shutter speed.

*Compensation for Nonlogarithmic Instrument Response*

It is desirable to compensate for the nonlogarithmic response of the typical exposure meter instrument which might be employed in a camera embodying the present invention, so that equal increments along the stepped sensing surface 29 of the pointer sensing member 28 (FIGS. 1–3 and 7) will always correspond to increments of movement of the instrument pointer in response to geometric changes in scene brightness. It has been discovered that this object may be accomplished by forming the stepped surface 29 of the sensing member 28 along a curve which intersects certain radii from the pivotal axis of the instrument pointer. These radii are coincident with and defined by pointer positions assumed in response to geometric increments of scene brightness. The curve is formed such that the linear distances between its intersections with successive ones of said radii are equal, and the shape of the curve is determined by measuring such equal steps. A curve determined in this manner for a typical instrument is shown at 31 in FIG. 7, where the radii spaced in accordance with geometric increments of scene brightness are shown at 71.

It has been discovered further that a curve determined as above from a typical instrument may be approximated with nicety by the arc of a circle of empirically determined radius. In accordance with this discovery, the stepped surface 29 of sensing member 28, illustrated in FIGS. 1–3 and 7, is formed as the arc of a circle whose radius is determined empirically. Obviously, the sensing member 28 might be formed exactly along curve 31 (FIG. 7), which would precisely compensate for the nonlogarithmic response of the instrument from which curve 31 was determined. However, manufacturing the sensing member in the shape of an arc of a circle is somewhat less expensive and has been found to be sufficiently precise for most purposes in amateur photography.

*Film Speed Compensation*

In order to compensate for changes in film speed in the exposure control system described above it has been found desirable to move the instrument body itself. However, in order that the approximate linearity achieved for the sensing member (by forming its sensing surface in an arc of a circle) may be maintained at any position of the instrument body, i.e., for any film speed, the instrument body is moved in an arc of another circle concentric with that in which the sensing member is formed. Obviously, if the sensing surface is formed in a curve other than the arc of a circle the instrument body should be moved in a curve which is equidistant therefrom. The following mechanism has been found convenient for positioning the instrument body 72 automatically as a function of the speed of a roll of film contained in any of a set of magazines that may be inserted into the camera.

Referring to FIGS. 1–3 and 6, the camera cover 112 has a back 114 hinged at 116 for opening. A locking plate 118 is mounted inside the top surface of cover 112 for sliding movement transversely of the taking-lens axis. A spring 120 urges plate 118 to the left as viewed in FIG. 6 and can be overcome by the manual operation of a slide knob 122 secured to plate 118 in a hole 124 and extending through a slot 123 in cover 112. A locking arm 126 on plate 118 cooperates with a pin 129 in the hinged camera back 114 to hold the latter in its closed position when plate 118 is released for leftward movement under spring tension after insertion of a magazine.

An arm 128 on plate 118 cooperates with a pin 130 on a control plate 132, which, like plate 118, is mounted for sliding movement transversely of the taking lens axis. The control plate 132 is guided by a pair of pins 134 and 136 which extend into respective slots 138 and 140 in that plate, and is urged to the left (as viewed in FIGS. 1 and 3) by resilient means, illustrated as a spring 142, secured to a film-speed sensing pawl 144, which is pivotally mounted at 146 on plate 132. An upturned ear 148 on plate 132 limits the clockwise movement of pawl 144 about pivot 146. The tension of spring 142 normally maintains pawl 144 rotated against ear 148. A downturned ear 150 on pawl 144 is adapted to cooperate with a surface irregularity, illustrated as a notch 152, in a magazine 154, the magazine being insertable into the back of the camera when the hinged back 114 is swung away from the camera body. The insertion of the magazine into the camera is accomplished in the following manner.

Button 122 is moved to the right to the end of slot 123 for releasing pin 129 from locking arm 126, at which time the camera back may be opened. The button 122 may be held to the right or released. Magazine 154 is then inserted into the camera back with notch 152 in an upper, forward position and button 122 is returned to the right, if it had been released. Arm 128 thereby forces pin 130 and plate 132 to the right against the tension of spring 142, thereby moving ear 150 toward the righthand end of the magazine surface 153 in which notch 152 is cut. Surface 153 bears against ear 150, rocking the sensing pawl 144 counterclockwise (as viewed in FIG. 6) about pivot 146 against the tension of spring 142. With the magazine fully seated in the camera the back is closed and button 122 is released, which permits plates 118 and 132 to be moved to the left. The locking plate 118 is moved to its full left position by spring 120, where locking arm 126 comes to rest against pin 129 for locking the camera back in its closed position. The control plate 132 is moved to the left by spring 142 until ear 150 enters notch 152 under the tension of spring 142. This stops further leftward movement of the plate 132 at a position corresponding to the position of notch 152. The position of this notch is empirically determined as a function of the speed of the photographic film contained in magazine 154. The higher the film speed the further to the right notch 152 will be cut.

It will be obvious that a separate spring may be employed for urging pawl 144 into notch 152, but that use of the single spring 142 both for this purpose and for moving plate 132 is more economical.

A downwardly extending arm 156 on control plate 132 has a slot 158 which extends also into the horizontal portion of that plate. A pin 160 extends into slot 158 and is secured to a plate 168 on which the exposure meter instrument 72 is mounted. Plate 168 is loosely secured to the camera cover 112 by rivets 170 and 172, which extend through an arcuate slot 174 in the cover. When the control plate 132 is positioned in the manner described above, its slot 158 therefore positions pin 160 and instrument 72 along an arcuate path determined by the shape of slot 174. The latter slot is shaped such that the pivotal axis of pointer 70 moves along a path which is substantially equidistant from, i.e., "parallel" to the cylindrical upper surface of the pointer sensing member 28. The position of the instrument is indicated by a pointer 171 thereon, which is visible through an arcuate window 173 in the instrument housing 113. A film-speed scale 175 may be located on the housing adjacent window 173.

*Off Range Indication and Compensation*

The indication that existing field brightness lies outside of the range of the automatic exposure control system of the camera, is illustrated in the accompanying drawings by means for indicating only that field brightness is below the normal automatic exposure range. Obviously the indication could be that the field brightness is above the range instead of, or in addition to, the indication first referred to.

Referring to FIGS. 1–3 and 7–10, an auxiliary pointer 200 is mounted on the instrument axis 73 near its upper end and terminates in a round indicator 202, which is adapted to be viewed through a window 204 in the top of the instrument housing 113. Window 204 is step shaped and comprises a scale, which is divided into zones 206 arranged in arcuately shaped rows and columns and a bottom zone 208. Each zone 206 carries an indicium "2," "4," "8" or "16," as shown in FIGS. 7–10 and are arranged such that if the existing field brightness is below the normal automatically controlled exposure range of the camera, indicator 202 is visible in a zone 206 numbered to correspond to the factor by which the minimum field brightness for automatic exposure must be divided to equal existing field brightness. Obviously, such indicia also represent off-range values of field brightness, and they may be expressed in actual brightness terms instead of the factor values illustrated.

The respective vertical columns of zones 206 correspond to respective ASA film speeds and therefore to the respective positions of the instrument body 72. For a given position of the instrument body, the possible positions of indicator 202 lie in a single column of zones 206 or an extension thereof. Therefore, each column of zones 206 forms an arc about the instrument axis 73. Similarly, each row of such zones is formed in a curve equidistant from, or "parallel" to sensing member 28 and therefore equidistant from the arcuate path of instrument axis 73.

The bottom zone 208 of scale 204 is reached by pointer 202 when the instrument point 70 is approximately at the zero position, indicating that no exposure is possible.

Figure 7:
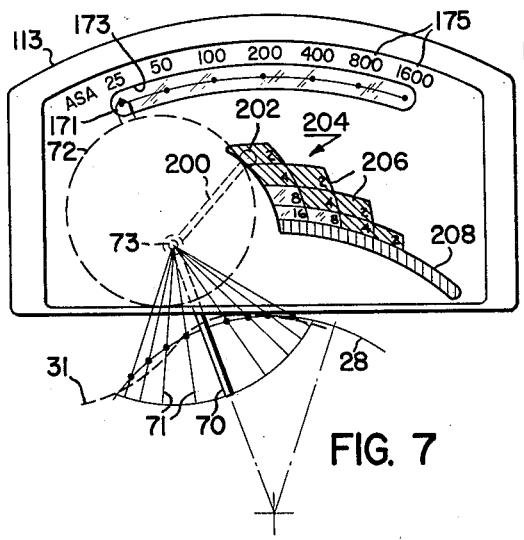
FIGS. 7–10 are top views of a portion of the camera illustrating schematically the relation between the range of positions of the measuring instrument and the range of positions of the off-range indicator relative to its scale.
Figure 8:
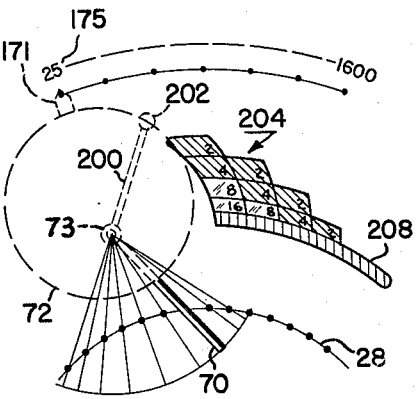

In FIG. 7, an ASA speed of 25 has been selected so that the instrument is in its leftmost position. Therefore, indicator 202 moves along the leftmost column of zones 206 in scale 204 or along an extension thereof. In FIG. 7 it can be seen that the movement of instrument pointers 70 and 200 are such that indicator 202 is in the uppermost zone of the leftmost column of zones 206, thereby indicating that the automatic exposure range has barely been exceeded, i.e., has been exceeded by approximately one stop. In FIG. 8, pointers 70 and 200 have moved further counterclockwise (as a result of increased field brightness) and have removed indicator 202 from alignment with scale 204, thereby indicating that a normal automatic exposure may be made.

Figure 9:
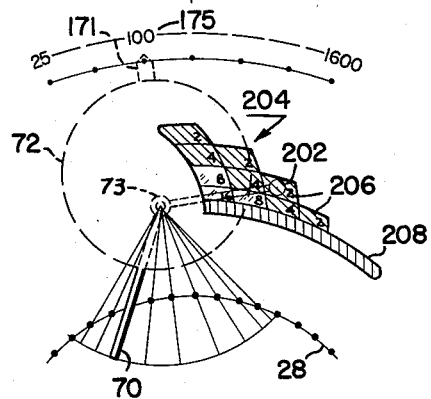

In FIG. 9 an ASA speed of 100 has been selected so that indicator 202 moves in the column of zones 206 third from the left, or in an extension thereof. The position of pointer 70 indicates a relatively low field brightness and the position of indicator 202 shows that existing field brightness is below the automatic exposure range by approximately a factor of 2, or one stop.

Figure 10:
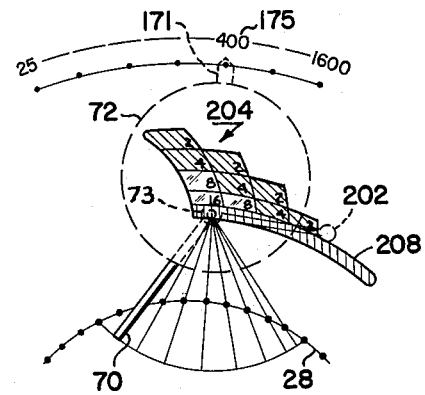

In FIG. 10 an ASA speed of 400 has been selected. Although the instrument pointer 70 is rather far to the left, indicating very low field brightness, the high film speed is such that indicator 202 lies outside of scale 204 and indicates that a normal automatic exposure may be made. However, a slight further decrease in field brightness would bring indicator 202 under the bottom arcuate zone 208 of window 204, indicating that no exposure would be advisable in such lighting conditions (because field brightness would be so low that the slight deflection, if any, of pointer 70 would be substantially meaningless).

In FIGS. 7–10, the zones numbered "2" and "4" may be tinted green, as shown, indicating that depending upon the exposure latitude of the film in use, the photographer may wish to take a photograph even though field brightness is below the automatic range by a factor of "2" or "4," i.e., by one or two stops. The bottom zone 208 may be tinted red as shown, indicating that no exposure is possible. The other zones, those numbered "8" and "16," may be left untinted in order to differentiate them from the green and red zones.

An interpretation of any of the numbered zones may be that the camera can be placed on a tripod and the exposure repeated the number of times shown, i.e., 2, 4, 8, or 16 times, in order to produce a normal photograph. Alternatively, the off-range condition may be compensated by adjusting the shutter speed below the normal handheld range, by moving the previously described knob 192 counterclockwise as shown in FIG. 4, or to the left as shown in FIG. 3. It is recalled that when knob 192 is in its furthest clockwise or righthand position the shutter is automatically adjustable for speeds within the normal handheld range, for example 1/30 to 1/200 second, and that when knob 192 is moved to the left of this position, the shutter speed may be reduced below 1/30 second. Referring particularly to FIG. 3, knob 192 is movable within a slot 218 in the shutter housing 26 and has a V-shaped edge 219 (FIG. 4) on its front surface cooperating with detents 220 along slot 218. Detents 220 are spaced in full stops of shutter speed, i.e., they are spaced such that they reduce the minimum hand-held speed by factors of 2, 4, 8 and 16, respectively. These factors may be indicated on a scale 224 on the shutter housing adjacent slot 218; the corresponding shutter speeds may be indicated on a scale 226 also adjacent slot 218 on the shutter housing. It will be seen that knob 192 may be moved to the left opposite an underexposure factor on scale 224 corresponding to the indicium carried by the zone 206 (FIGS. 7–10) with which indicator 202 is aligned to identify the factor by which field brightness is below the normal automatic exposure range of the camera. This adjustment of the shutter speed compensates for the off-range field brightness to an accuracy of one-half stop. Of course, when field brightness increases such that indicator 202 (FIGS. 7–10) either moves into another zone 206 of scale 204 or moves altogether out of alignment with that scale, knob 192 (FIG. 3) should be relocated in slot 218 accordingly.

Figure 11:
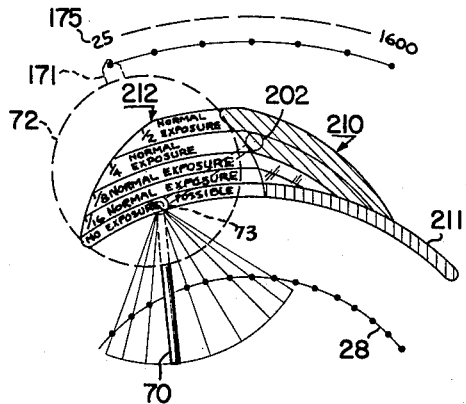
FIGS. 11 and 12 are top views similar to FIGS. 5–8, illustrating an alternate form of off-range scale.
Figure 12:
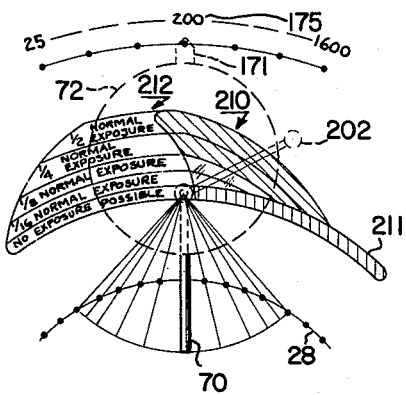

A second form of off-range indicator window, or scale is shown in FIGS. 11 and 12 at 210, with more informative indicia 212 opposite each of a series of arcuate scale zones. No distinction is made in this case between groups of zones according to the instrument position. A bottom zone 211 again is provided to indicate that no exposure is possible. FIG. 11 shows the indicator 202 in a position such that field brightness is off-range by a factor of 4, with a selected film speed of 25. FIG. 12 shows a selected film speed of 200 with indicator 202 in a position such that normal automatic exposure is possible.

Figure 13:
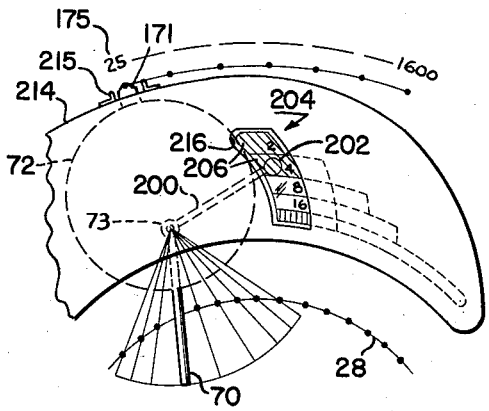
FIGS. 13 and 14 are top views similar to FIGS. 5–8, illustrating a masking arrangement for the off-range scale.
Figure 14:
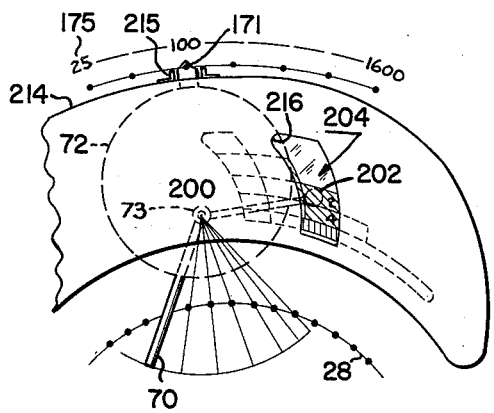

FIGS. 13 and 14 illustrate a further form of the invention, wherein a mask 214 is coupled to the instrument ASA pointer 171 by a bracket 215 and is moved in an arcuate path along with the instrument. Mask 214 has a window 216, which for any given position of the instrument 72, exposes only the column of zones 206 in scale 204 (illustrated as of the same type as in FIGS. 7–10) corresponding to the selected film speed. In this manner, the irrelevant portions of window 204 are covered by mask 214.

The invention has been described in detail with particular reference to preferred embodiments thereof, but it will be understood that variations and modifications can be effected within the spirit and scope of the invention as described hereinabove and as defined in the appended claims.

I claim:

1. In a camera, the combination comprising: an exposure meter including a photocell adapted to be illuminated by field light, and an electrical measuring instrument electrically connected to said cell, said instrument having a pointer angularly movable about a pivot as a function of field brightness; a pointer sensing member; means for moving said measuring instrument to compensate for changes in an exposure factor; means for guiding said instrument for movement in a path such that the pivot of said pointer remains substantially equidistant from said sensing member; a manually operable camera actuating member; means coupling said actuating member to said sensing member for yieldably moving said sensing member into engagement with said pointer in response to operation of said actuating member, such that engagement of said sensing member with said pointer at substantially equally spaced positions on said sensing member corresponds to geometric changes in field brightness; at least one exposure regulating device; means coupling said sensing member to said exposure regulating device for adjusting the latter as a function of the extent of movement of said sensing member prior to its engagement with said pointer, thereby regulating the exposure of film in said camera to compensate for any field brightness within a predetermined brightness range; an indicator moved by said instrument; and a housing for said instrument and said indicator, said housing having a window with which said indicator is aligned by said instrument when existing field brightness is at any of a plurality of values outside of said range, said window having zones to identify, by the alignment of said indicator with a given zone, the extent to which existing field brightness lies outside said range.

2. In a camera, the combination comprising: an exposure meter including a photocell adapted to be illuminated by field light, and an electrical measuring instrument electrically connected to said cell, said instrument having a pointer angularly movable about a pivot as a nonlogarithmic function of field brightness; a curved member for sensing said pointer; means for moving said measuring instrument to compensate for changes in an exposure factor; means for guiding said instrument for movement in a path such that the pivot of said pointer remains substantially equidistant from the curve of said sensing member; a manually operable camera actuating member; means coupling said actuating member to said sensing member for yieldably moving said sensing member in a predetermined path, in response to operation of said actuating member, to engage said sensing member with said pointer, the curve of said sensing member being of such shape that for any position of said instrument along its path, the path of said sensing member intersects, at approximately equal-spaced points, respective loci assumed by said pointer in response to successive geometrically progressing values of field brightness within a predetermined range of brightness values; at least one exposure regulating device; and means coupling said sensing member to said exposure regulating device for adjusting the latter as a function of the extent of movement of said sensing member prior to its engagement with said pointer; an indicator moved by said instrument; and a housing for said instrument and said indicator, said housing having a window with which said indicator is aligned by said instrument when existing field brightness is at any of a plurality of values outside of said range, said window having zones to identify, by the alignment of said indicator with a given zone, the extent to which existing field brightness differs from an extreme value of brightness within said range.

3. The combination defined in claim 2, wherein said window zones are arranged in mutually parallel columns defined by arcs of circles about said instrument pivot at a plurality of positions of said instrument, and in rows which are parallel to each other and to the curve of said sensing member.

4. The combination defined in claim 3, with a mask coupled to said instrument and movable therewith, said mask having a window disposed for alignment, in any one position of said mask, with one and only one column of said zones corresponding to the position of said instrument.

5. In a camera, the combination comprising: an exposure meter including a photocell adapted to be energized by field light; means controlled by said instrument for regulating exposure of film in said camera in response to variations in field brightness within a predetermined range of brightness values; means carrying a scale having a plurality of zones representing predetermined values of field brightness outside of said range; and an indicator disposed in cooperative relation to said scale and adapted to be positioned relative thereto as a function of the energization of said cell, said indicator identifying, by its alignment with one of said zones, the corresponding value of existing field brightness outside of said range.

6. The combination defined in claim 5, with: manually adjustable compensating means for regulating exposure of said film to compensate for the off-range field brightness identified by said indicator on said scale.

7. The combination defined in claim 6, wherein at least said one zone carries an indicium representing the extent to which existing field brightness lies outside of said range, with: a pointer moved by said compensating means; and means carrying a second scale cooperating with said pointer to indicate the amount of adjustment necessary for said compensation.

8. The combination defined in claim 7, wherein the said second scale includes an indicium identical to that carried by said one zone.

9. The combination defined in claim 5, wherein said meter includes an electrical measuring instrument energized by said cell and coupled to said indicator for positioning the latter, said instrument being movable along a predetermined path to compensate for changes in an exposure factor, said indicator being alignable with at least one of said zones in each of a plurality of positions of said instrument.

10. The combination defined in claim 9, with a mask coupled to said instrument for movement therewith, said mask having a window overlying, at each position of said instrument, each zone with which said indicator is alignable at said instrument position.

11. The combination defined in claim 9, with a pointer movable with said instrument, said pointer cooperating with a second scale graduated in units of said exposure factor.

12. The combination defined in claim 5, wherein at least said one zone carries a numerical indicium representing the factor by which existing field brightness lies outside of said range when said indicator is aligned with said one zone.

13. The combination defined in claim 5, wherein at least said one zone is colored according to a code to distinguish its significance from another of said zones.

14. In a camera, the combination comprising: an exposure meter including a photocell adapted to be illuminated by field light; and an electrical measuring instrument electrically connected to said cell; means controlled by said instrument for regulating exposure of film in said camera in response to variations in field brightness within a predetermined range of brightness values; an indicator moved by said instrument; and a housing for said instrument and said indicator, said housing having a window with which said indicator is aligned by said instrument when existing field brightness is at any of a plurality of values outside of said range, said window having zones to identify, by the alignment of said indicator with a given zone, the extent to which existing field brightness lies outside of said range.

15. In a camera having first and second adjustable exposure regulating members comprising a variable speed shutter and an adjustable lens diaphragm, the combination comprising: an exposure meter including a photocell adapted to be energized by field light, means interrelating said meter and at least one of said regulating members for adjusting the latter as a function of field brightness, thereby to regulate the exposure of film in said camera to compensate for any field brightness within a predetermined brightness range; manually operable means for adjusting at least one of said exposure regulating members; means carrying a first scale having a plurality of zones representing predetermined values of field brightness outside of said range; an indicator adapted to be positioned relative to said first scale as a function of the energization of said cell for identifying, by the alignment of said indicator with one of said zones, a value of existing field brightness outside of said range; a pointer moved by said manually operable means; and means carrying a second scale cooperating with said pointer for indicating an amount of adjustment of at least one of said exposure regulating devices sufficient to compensate for the extent to which said existing field brightness, as indicated on said first scale, lies outside of said range.

16. In a camera having an adjustable lens diaphragm, the combination comprising: an exposure meter including a photocell adapted to be energized by field light, means interrelating said meter and said lens diaphragm for adjusting the latter automatically as a function of field brightness, thereby to regulate the exposure of film in said camera to compensate for any field brightness within a predetermined brightness range; means carrying a scale having a plurality of zones representing predetermined values of field brightness outside of said range; and an indicator adapted to be positioned relative to said scale as a function of the energization of said cell for identifying, by the alignment of said indicator with one of said zones, a value of existing field brightness outside of said range.

17. In a camera having first and second adjustable exposure regulating members comprising a variable speed shutter and an adjustable lens diaphragm, the combination comprising: an exposure meter including a photocell adapted to be energized by field light, means interrelating said meter and said lens diaphragm for adjusting the latter as a function of field brightness, thereby to regulate the exposure of film in said camera to compensate for any field brightness within a predetermined brightness range; manually operable means for adjusting the speed of said shutter; means carrying a first scale having a plurality of zones representing predetermined values of field brightness outside of said range; an indicator adapted to be postiioned relative to said first scale as a function of the energization of said cell for identifying, by the alignment of said indicator with one of said zones, a value of existing field brightness outside of said range; a pointer moved by said manually operable means; and means carrying a second scale cooperating with said pointer for indicating the amount of shutter speed adjustment sufficient to compensate for the extent to which said existing field brightness, as indicated on said first scale, lies outside of said range.

References Cited in the file of this patent
UNITED STATES PATENTS

| | | |
|---|---|---|
| 2,841,064 | Bagby | July 1, 1958 |
| 2,920,542 | Engelsmann | Jan. 12, 1960 |
| 2,928,323 | Steisslinger | Mar. 15, 1960 |